United States Patent
Burdgick et al.

(10) Patent No.: US 6,402,466 B1
(45) Date of Patent: Jun. 11, 2002

(54) LEAF SEAL FOR GAS TURBINE STATOR SHROUDS AND A NOZZLE BAND

(75) Inventors: Steven Sebastian Burdgick, Schenectady, NY (US); Brendan Francis Sexton, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/571,814

(22) Filed: May 16, 2000

(51) Int. Cl.$^7$ .................................................. F10D 11/08

(52) U.S. Cl. ..................... 415/173.3; 415/135; 415/139; 415/173.1; 415/174.2; 415/209.2; 277/630; 277/631; 277/637; 277/644

(58) Field of Search .................................. 415/135, 138, 415/139, 173.1, 173.3, 174.2, 189, 190, 209.2, 209.3, 209.4; 277/630, 631, 632, 637, 641, 644

(56) References Cited

U.S. PATENT DOCUMENTS

| | | | | |
|---|---|---|---|---|
| 4,184,689 A | * | 1/1980 | Brodell et al. | 277/632 |
| 4,314,793 A | * | 2/1982 | DeTolla et al. | 415/135 |
| 5,118,120 A | * | 6/1992 | Drerup et al. | 415/174.2 |
| 5,145,316 A | * | 9/1992 | Birch | 415/173.1 |
| 5,211,407 A | * | 5/1993 | Glynn et al. | 277/632 |
| 5,333,992 A | * | 8/1994 | Kane et al. | 415/173.1 |
| 5,562,408 A | * | 10/1996 | Proctor et al. | 415/173.1 |
| 5,645,398 A | * | 7/1997 | Benoist et al. | 415/135 |
| 5,797,723 A | * | 8/1998 | Frost et al. | 415/174.2 |
| 5,971,703 A | * | 10/1999 | Bouchard | 415/173.1 |
| 6,027,125 A | * | 2/2000 | Guest | 277/641 |
| 6,076,835 A | * | 6/2000 | Ress et al. | 415/174.2 |
| 6,126,389 A | * | 10/2000 | Burdgick | 415/173.1 |
| 6,164,656 A | * | 12/2000 | Frost | 415/173.3 |
| 6,200,091 B1 | * | 3/2001 | Bromann et al. | 415/173.1 |

OTHER PUBLICATIONS

"39th GE Turbine State–of–the–Art Technology Seminar", Tab 1, ""F"Technology –the first Half Million Operating Hours", H. E. Miller, Aug. 1996.

"39th GE Turbine State–of–the–Art Technology Seminar", Tab 2, "GE Heavy–Duty Gas Turbine Performance characteristics", F. J. Brooks, Aug. 1996.

"39th GE Turbine State–of–the–Art Technology Seminar", Tab 3, "9EC 50Hz 170 –MW Class Gas Turbine", A. S. Arrao, Aug. 1996.

"39th GE Turbine State–of–the–Art Technology Seminar", Tab 4, "MWS6001FA –An Advanced –Technology 70–MW Class 50/60 Hz Gas Turbine", Tamachandran et al., Aug. 1996.

"39th GE Turbine State–of–the–Art Technology Seminar", Tab 5, "Turbomachinery Technology Advances at Nuovo Pignone", Benvenuti et al., Aug. 1996.

"39th GE Turbine State–of–the–Art Technology Seminar", Tab 6, "GE Aeroderivative Gas Turbines –Design and Operating Features", M.W. Horner, Aug. 1996.

"39th GE Turbine State–of–the–Art Technology Seminar", Tab 7, "Advance Gas Turbine Materials and coatings", P.W. Schilke, Aug. 1996.

"39th GE Turbine State–of–the–Art Technology Seminar", Tab 8, "Dry Low $NO_x$ Combustion Systems for GE Heavy-Duty Turbines", L. B. davis, Aug. 1996.

(List continued on next page.)

Primary Examiner—Christopher Verdier
(74) Attorney, Agent, or Firm—Nixon & Vanderhte (57) ABSTRACT

A leaf seal assembly is secured to the trailing edge of a shroud segment for sealing between the shroud segment and the leading edge side wall of a nozzle outer band. The leaf seal includes a circumferentially elongated seal plate biased by a pair of spring clips disposed in a groove along the trailing edge of the shroud segment to maintain the seal plate in engagement with the flange on the leading edge side wall of the nozzle outer band. The leaf seal plate and spring clips receive pins tack-welded to the shroud segment to secure the leaf seal assembly in place.

13 Claims, 3 Drawing Sheets

OTHER PUBLICATIONS

"39th GE Turbine State–of–the–Art Technology Seminar", Tab 9, "GE Gas Tubine Combustion Flexibility", M. A. Davi, Aug. 1996.

"39th GE Turbine State–of–the–Art Technology Seminar", Tab 10, "Gas Fuel Clean–Up System Design considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century a"H" Gas Turbine combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine conversions, Modifications and Uprates Technology", Stuck et al., Aug. 1996.

"39th GE Turbine State–of–the–Art Technology Seminar", Tab 15, "nPerformance and Reliability Improvements for Heavy–Duty gas Turbines,"J. R. Johnston, Aug. 1996.

"39th GE Turbine State–of–the–Art Technology Seminar", Tab 16, "gas Turbine Repair Technology", Crimi et al, Aug. 1996.

"39th GE Turbine State–of–the–Art Technology Seminar", Tab 17, "Heavy Duty Trubine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., aug. 1996.

"39th GE Turbine State–of–the–Art Technology Seminar", Tab 22, "Steam Turbine Sustained Efficiencey", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines"D. R. Leger, Aug. 1996.

"39th GE Turbine State–of–the–Art Technology Seminar", Tab 25, "Steam Turbines for STAG™ combined–Cycle Power Systems", M. Boss, Aug. 1996.

"39th GE Turbine State–of–the–Art Technology Seminar", Tab 26, "congeneration Application considerations", Fisk et al., Aug. 1996.

"39th GE Turbine State–of–the–Art Technology Seminar", Tab 27, "Performance and Economic Considerations of Repowering steam Power Plants", Stoll et al., Aug. 1996.

"39th GE Turbine State–of–the–Art Technology Seminar", Tab 28, "High–Power–Density™ Steam Turbine Design Evolution"J. H. Moore, Aug. 1996.

"39th GE Turbine State–of–the–Art Technology Seminar", Tab 29, "Advances in Steam Path Tehnologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial turbines", R. C. Beck, Aug. 1996.

"39th GE Turbine State–of–the–Art Technology Seminar", Tab 32, "Thermal Performance Evaluation and Assessment of Steam turbine Units", Pl Albert, Aug. 1996.

"39th GE Turbine State–of–the–Art Technology Seminar", Tab 33, "Advances in Welding Repair Technology"J. F. Nolan, Aug. 1996.

"39th GE Turbine State–of–the–Art Technology Seminar", Tab 34, "Operation and AMaintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product line and Performance", Chase, et al., Aug. 1996.

"39th GE Turbine State–of–the–Art Technology Seminar", Tab 38, "GE Combined Cycle Experience", Masiak et al., Aug. 1996.

"39th GE Turbine State–of–the–Art Technology Seminar", Tab 39, "Single–Shaft Combined Cycle Power Generation Systems", Tomlinson et al. Aug. 1996.

"Advanced Turbine System Program –ConceptualDesign and Product Development"Annual Report, Sep. 1, 1994. –Aug. 31, 1995.

"Advanced Turbine Systems (ATS Program) Conceptual Design and Product Development", Final Technical Progress Report, Volume 2 –Industrial Machine, Mar. 31, 1997, Morgantown, WV.

"Advanced Turbine Systems (ATS Program), Conceptual Design and Product Development",Final Technical Progress Report, Aug. 31, 1996, Morgantown, WV.

"Advanced Turbine Systems (ATS Program), Phase 2, Conceptual Design and Product Development", Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U. S. Department of Energy, Office of Industrial technologies Federal Energy Tehnology Center.

"ATS Conference"Oct. 28, 1999, Slide Presentation.

"Baglan Bay Launch Site", carios articles relating to Baglan Energy Park.

"Baglan Energy Park", Brochure.

"Commercialization", Del Williamson, Present, Global Sales, May 8, 1998.

"Enviromental, Health and Safety Assessment: ATS 7H Prograam (Phase 3R) Test Activities at the GE Power Systems Gas Turbine Manufacturing Facility, Greenville, SC", Document '1753, Feb. 1998, Publication Date: Nov. 17, 1998, Report Numbers DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS900 1H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century—"H" Gas Turbine Combined Cycles", Thomas C. Paul et al., Report.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement", various newspaper clippings relating to improved generator.

"Proceedings of the Advanced Turbine Systems Annual Program Review Meeting", vol. 1, "Industrial Advanced Turbine Systems Program Overview", Esbeck, pp. 3–13, Oct., 1995.

"Proceedings of the Advanced Turbine Systems Annual Program Review Meeting", vol. 1, "H Gas Turbine Combined Cycle", J. Corman, pp. 14–21, Oct., 1995.

"Proceedings of the Advanced Turbine Systems Annual Program Review Meeting", vol. 1, "Overview of Westinghouse's Advanced Turbine Systems Program", Bannister et al., pp. 22–30, Oct., 1995.

"Proceedings of the Advanced Turbine Systems Annual Program Review Meeting", vol. 1, "Allison Engine ATS Program Technical Review", D. Mukavetz, pp. 31–42, Oct., 1995.

"Proceedings of the Advanced Turbine Systems Annual Program Review Meeting", vol. 1, "Advanced Turbine Systems Program Industrial System Concept Development", S. Gates, pp. 43–63, Oct., 1995.

"Proceedings of the Advanced Turbine Systems Annual Program Review Meeting", vol. 1, "Advanced Turbine System Program Phase 2 Cycle Selection", Latcovich, Jr., pp. 64–69, Oct. 1995.

"Proceedings of the Advanced Turbine Systems Annual Program Review Meeting", vol. 1, "General Electric ATS Program Technical Review Phase 2 Activities", Chance et al., pp. 70–74, Oct., 1995.

"Proceedings of the Advanced Turbine Systems Annual Program Review Meeting", vol. 1, "Technical Review of Westinghouse's Advanced Turbine Systems Program", Diakunchak et al., pp. 75–86, Oct., 1995.

"Proceedings of the Advanced Turbine Systems Annual Program Review Meeting", vol. 1, "Advanced Combustion Turbines and Cycles: An EPRI Perspective", Touchton et al., pp. 87–88, Oct., 1995.

"Proceedings of the Advanced Turbine Systems Annual Program Review Meeting", vol. I, "Advanced Turbine Systems Annual Program Review", William E. Koop, pp. 89–92, Oct., 1995.

"Proceedings of the Advanced Turbine Systems Annual Program Review Meeting", vol. I, "The AGTSR Consortium: An Update", Fant et al., pp. 93–102, Oct., 1995.

"Proceedings of the Advanced Turbine Systems Annual Program Review Meeting", vol. I, "Overview of Allison/AGTSR Interactions", Sy A. Ali, pp. 103–106, Oct., 1995.

"Proceedings of the Advanced Turbine Systems Annual Program Review Meeting", vol. I, "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147, Oct., 1995.

"Proceedings of the Advanced Turbine Systems Annual Program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinhouse Thermal Barrier Coatings", Goedjen et al., pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. pp. 233–248, Oct., 1995.

"Proceedings of the Advanced Turbine Systems Annual Program Review Meeting", vol. II, "Lean Premixed Flames for Low $NO_x$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et la., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting", vol. II, The Role of Reactant Unmixedness, Strain Rate, and Length Scale on Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct. 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", pp. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al. pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov. 1996.

"Proceedings of the Advanced Turbine Systems Annual Program Review Meeting", "$NO_x$ and CO Emissions Models for Gas–Fired Lean–Premixed Combustion Turbines", A. Mellor pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", Active Control of Combustion Instabilities in Low $NO_x$ Turbines, Ben T. Zinn, pp. 253–264, Nov., 1996.

"Proceedings of the Advanced Turbine Systems Annual Program Review Meeting", "Life Prediction of Advanced Materials for Gas Turbine Application," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject ot Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Normand Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Status of Ceramic Gas Turbines in Russia", Mark van Roode, p. Nov., 1996.

"Status Report: The U.S. Department of Energy's Advanced Turbine systems Program", facsimile dated Nov. 7, 1996.

"Testing Program Results Validate GE's H Gas Turbine—High Efficiency, Low Cost of Electricity and Low Emissions", Roger Schonewald and Patrick Marolda, (no date available).

"Testing Program Results Validate GE's H Gas Turbine—High Efficiency, Low Cost of Electricity and Low Emissions", Slide Presentation—working draft, (no date available).

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Nos.: DOE/MC/31176–13 5628.

"Utility Advanced Turbine System (ATS) Technology Readiness Testing—Phase 3", Document #666274, Oct. 1, 1996–Sep. 30, 1997, Publication Date, Dec. 31, 1997, Report Nos.: DOE/MC/31176—10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Nos.: DOE/MC/31176—5340.

"Utility Advanced Turbine System (ATS) Technology Readiness Testing and Pre–Commercial Demonstration—Phase 3", Document #486132, Apr. 1–Jun. 30, 1976, Publication Date, Dec. 31, 1996, Report Nos.: DOE/MC/31176—5660.

"Utility Advanced Turbine System (ATS) Technology Readiness Testing and Pre–Commercial Demonstration—Phase 3", Document #5879906, Jul. 1–Sep. 30, 1995, Publication Date, Dec. 31, 1995, Report Nos.: DOE/MC/31176—5339.

"Utility Advanced Turbine System (ATS) Technology Readiness Testing and Pre–Commercial Demonstration" Document #666277, Apr. 1–Jun. 30, 1997, Publication Date, Dec. 31, 1997, Report Nos.: DOE/MC/31176—8.

"Utility Advanced Turbine System (ATS) Technology Readiness Testing and Pre–Commercialization Demonstration" Jan. 1–Mar. 31, 1996, DOE/MC/31176—5338.

"Utility Advanced Turbine System (ATS) Technology Readiness Testing: Phase 3R", Document #756552, Apr. 1–Jun. 30, 1999, Publication Date, Sep. 1, 1999, Report Nos.: DE—FC21–95MC31176–23.

"Utility Advanced Turbine System (ATS) Technology Readiness Testing.", Document #656823, Jan. 1–Mar. 31, 1998, Publication Date, Aug. 1, 1998, Report Nos. DOE/MC/31176–17.

"Utility Advanced Turbine System (ATS) Technology Readiness Testing and Pre–Commercial Demonstration", Annual Technical Progress Report, Reporting Period: Jul. 1, 1995–Sep. 30, 1996.

"Utility Advanced Turbine System (ATS) Technology Readiness Testing", Phase 3R, Annual Technical Progress Report, Reporting Period: Oct. 1, 1997–Sep. 30, 1998.

"Utility Advanced Turbine System (ATS) Technology Readiness Testing", Document #750405, Oct. 1–Dec. 30, 1998, Publication Date: May 1, 1999, Report Nos.: DE–FC21–95MC31176–20.

"Utility Advanced Turbine System (ATS) Technology Readiness Testing", Document #1348, Apr. 1–Jun. 29, 1998, Publication Date Oct. 29, 1998, Report Nos.: DE–FC21–95MC31176—18.

"Utility Advanced Turbine System (ATS) Technology Readiness Testing—Phase 3", Annual Technical Progress Report, Reporting Period: Oct. 1, 1996–Sep. 30, 1997.

"Utility Advanced Turbine System (ATS) Technology Readiness Testing and Pre–Commercial Demonstration", Quarterly Report, Jan. 1–Mar. 31, 1997, Document #666275, Report Nos.: DOE/MC/31176–07.

"Proceedings of the 1997 Advanced Turbine Systems", Annual Program Review Meeting, Oct. 28–29, 1997.

* cited by examiner

LEAF SEAL FOR GAS TURBINE STATOR SHROUDS AND A NOZZLE BAND

This invention was made with Government support under Contract No. DE-FC21-95MC31176 awarded by the Department of Energy. The Government has certain rights in this invention.

BACKGROUND OF THE INVENTION

The present invention relates to a seal for sealing between a stator shroud and a leading edge of a nozzle wall along the outer band of a nozzle segment defining in part the hot gas path through the gas turbine.

In an industrial gas turbine, shroud segments are fixed to turbine shell hooks in an annular array to form an annular shroud radially outwardly and adjacent the tips of buckets forming part of the turbine rotor. The inner wall of the shroud defines part of the gas path. Typically, nozzles are hooked into the radial slots in the shroud segments. However, the cavities forward and aft of the shroud segments are at a higher pressure than the pressure of the gas path and significant leakage into the hot gas path frequently occurs. These cavities are typically pressurized by compressor discharge air and leakage of this air is detrimental to turbine performance and emissions. The leakage is compounded in those nozzle stages having non-continuous nozzle leading edge hooks. That is, the gaps between the hooks and adjacent the edges of the shrouds provide large leakage paths for compressor discharge air to flow into the hot gas flow path. It is therefore desirable to provide a seal effective between the stator shroud segments and the nozzle wall, particularly in those turbines having non-continuous nozzle hooks, to minimize leakage flow into the hot gas path.

BRIEF SUMMARY OF THE INVENTION

In accordance with a preferred embodiment of the present invention, there is provided a shroud system affording an effective seal between the shroud segments and the nozzle side wall band, particularly the leading edge side wall of the nozzle band. Particularly, inner and outer shrouds are provided with complementary hooks and grooves adjacent the leading and trailing edges of each shroud for joining the inner and outer shrouds to one another. The outer shroud is, in turn, secured to a turbine shell hook. In a preferred embodiment, each shroud segment has one outer shroud and two inner shrouds. The shroud segments form an annular array thereof about the turbine rotor axis to form a shroud set. More particularly, the leading edge of the adjacent nozzle side wall band has a forward projection or "nub" for interfacing with a shroud leaf seal adjacent the trailing edge of the shroud segment. The leaf seal may be mounted on either the two inner shrouds or on the outer shroud. The leaf seal spans the circumference of the shroud segment and is spring-loaded in an aft direction by a pair of spring clips. The leaf seal and spring clips are pinned to the shroud segment in a radially outwardly extending groove along the shroud segment. To create the smallest leakage possible employing a leaf seal engaging against the nub or flange of the leading edge side wall of the outer band of the nozzle, the leaf seal is pivoted to the shroud segment such that it extends perpendicular to the turbine centerline during operation. The seals are also provided with overlaps such that each overlap seals between adjacent leaf seals of adjacent segments.

In a preferred embodiment according to the present invention, there is provided a seal for sealing between a stator shroud and a nozzle of a gas turbine to substantially preclude leakage between a pressurized cavity on one side of the seal and hot gases in a hot gas path of the gas turbine on the other side of the seal, comprising a shroud segment having a surface for, in part, defining the hot gas path and overlying tips of buckets forming part of a turbine rotor, an outer band for, in part, defining the hot gas path and forming part of the nozzle of the turbine, a leaf seal between the shroud segment and the nozzle outer band and a spring engaging the shroud segment and the leaf seal for biasing the leaf seal into sealing engagement with the nozzle outer band.

In a further preferred embodiment according to the present invention, there is provided a seal for sealing between a stator shroud and a nozzle of a gas turbine to substantially preclude leakage between a pressurized cavity on one side of the seal and hot gases in a hot gas path of the gas turbine on the other side of the seal, comprising a shroud segment having a surface for, in part, defining the hot gas path and overlying tips of buckets forming part of a turbine rotor, the shroud segment having a leading edge and a trailing edge, an outer band for, in part, defining the hot gas path and forming part of the nozzle of the turbine, a leaf seal between the trailing edge of the shroud segment and a leading edge side wall of the nozzle outer band, the shroud segment having a seat for receiving the leaf seal and a spring engaging the shroud segment and the leaf seal for biasing a portion of the leaf seal into sealing engagement with the leading edge side wall of the nozzle outer band.

DETAILED DESCRIPTION OF THE INVENTION

Figure 1:
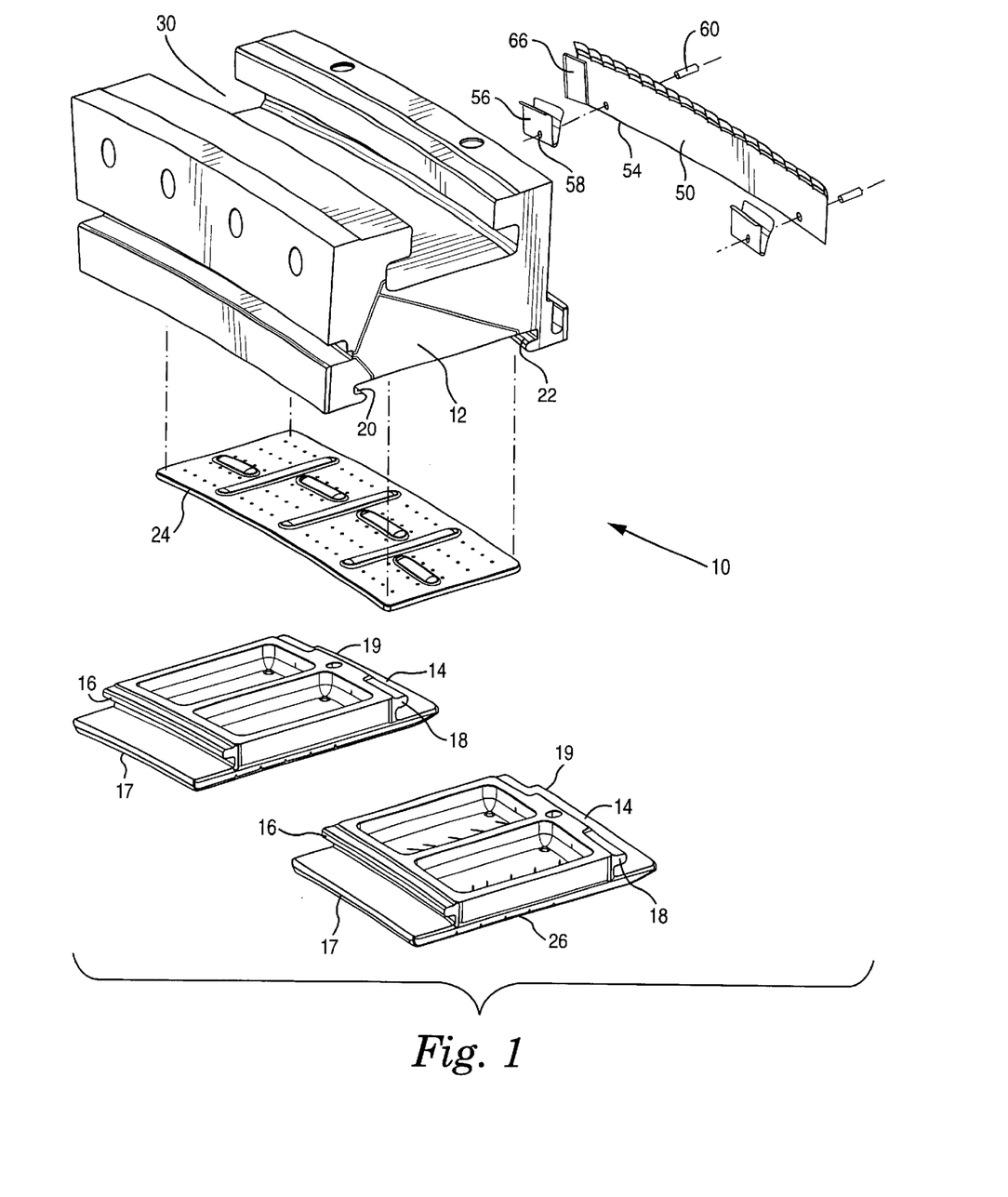
FIG. 1 is a perspective view of a shroud segment with a leaf seal assembly constructed in accordance with a preferred embodiment of the present invention and illustrated with parts broken out for clarity.

Referring now to the drawings, particularly to FIG. 1, there is illustrated a shroud segment, generally designated 10, comprised of an outer shroud 12 and a pair of inner shrouds 14 for securement to the outer shroud 12. The inner shrouds have hooks 16 and 18 adjacent their leading and trailing edges 17 and 19, respectively, for circumferential slidable engagement in grooves 20 and 22 of the outer shroud 12 in final assembly. The inner and outer shrouds also mount an impingement cooling plate 24 between the shrouds for impingement cooling of the wall surfaces 26 of the shroud segment, for example, by steam impingement cooling, which forms no part of the present invention. The outer shroud 12 has a radially outer dovetail groove 30 for receiving a hook 32 forming part of the fixed turbine shell for securing the shroud segment 10 to the shell. It will be appreciated that an annular array of shroud segments 10 are formed about the rotor of the gas turbine and about the tips of the buckets 35 on the rotor thereby defining an outer wall or boundary 31 for the hot gas flowing along the hot gas path 33 of the turbine.

Figure 3:
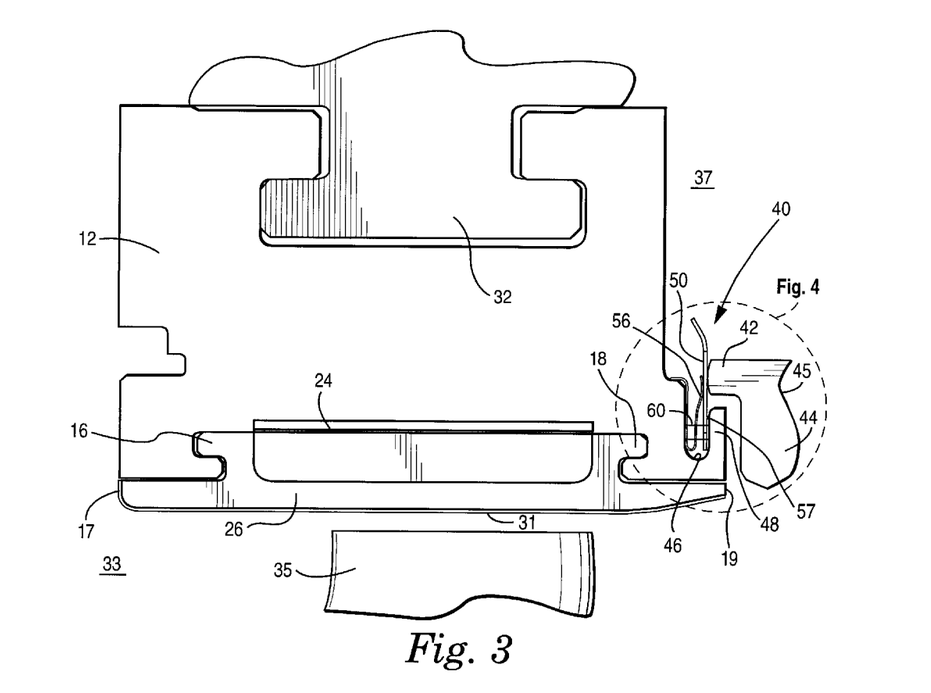
FIG. 3 is a view similar to FIG. 2 illustrating a leaf seal assembly for use with the outer shroud of the shroud segment illustrated in FIG. 3.

Referring now particularly to FIGS. 1 and 3, a leaf seal assembly, generally designated 40, is provided along the trailing edge of the shroud segment 10 and interfaces with a forward flange or nub 42 of a leading edge side wall 44 of a nozzle stage outer band 45. The seal assembly 40 seals between the hot gas path 33 and a cavity 37 on the turbine shell side. In FIGS. 1 and 3, the leaf seal 40 is mounted on the outer shroud 12. Particularly, the trailing edge of the outer shroud 12 includes a seat 46, e.g., a groove, having a radially outwardly and circumferentially extending flange 48 for receiving the leaf seal assembly 40. Particularly, the leaf seal assembly 40 includes a circumferentially elongated flat plate 50 received in the groove 46. The plate 50 extends radially outwardly and engages along its trailing face the flange 42 of the leading edge side wall 44 of the nozzle band 45. The leaf seal plate 50 includes a pair of openings 54 (FIG. 1) adjacent opposite ends. A pair of generally U-shaped spring clips 56 likewise have openings 58 passing therethrough. The spring clips 56 have a base and a pair of legs and are disposed in opposite ends of the groove 46 with the openings 58 thereof aligned with openings 54 of the leaf seal plate 50. Pins 60 are extended through the plate 50 and spring clips 56 to engage in openings on the trailing edge face of the outer shroud 12 and within the groove 46. The pins 60 are preferably tack-welded in place to secure the leaf seal plate 50.

Figure 4:
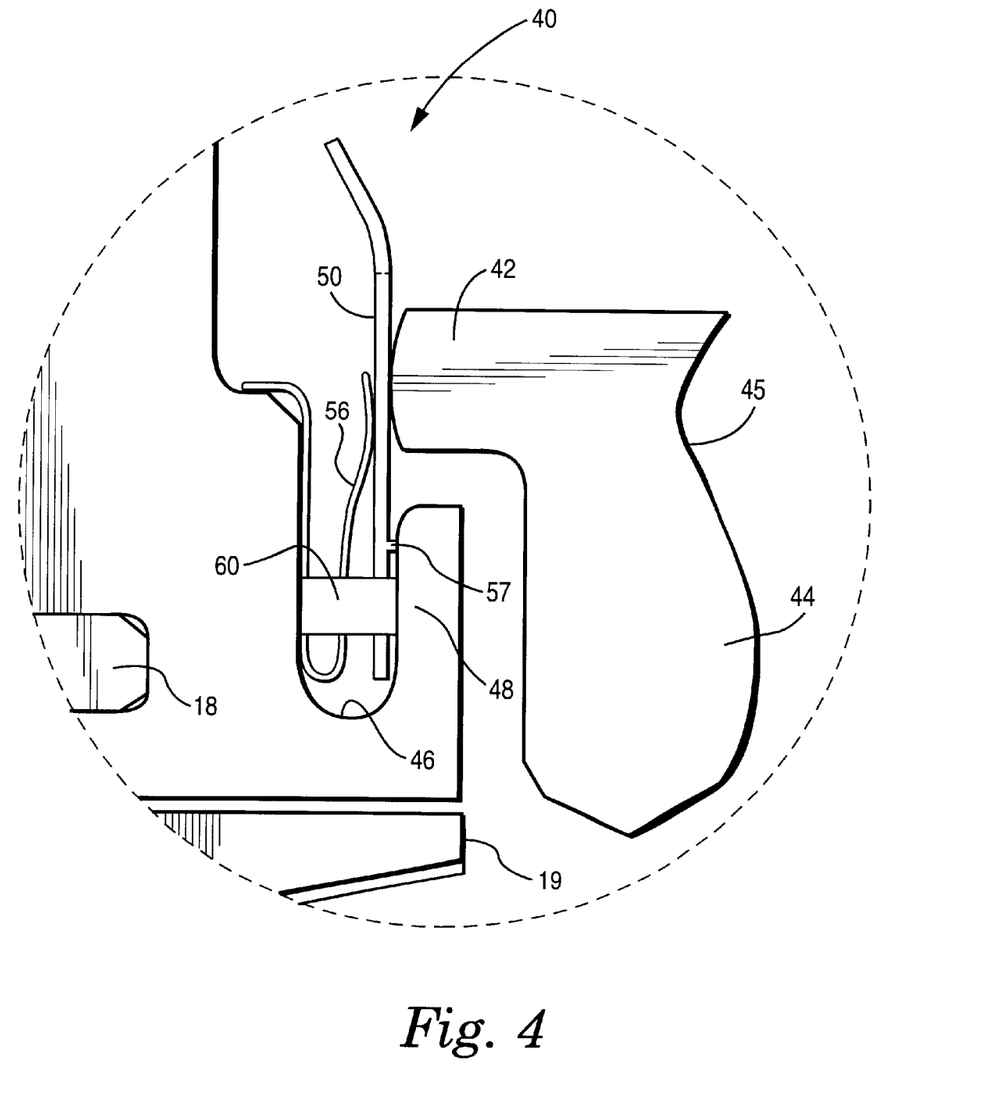
FIG. 4 is an enlarged side elevational view of the leaf seal assembly of FIGS. 1 and 3.

The plate 50 as illustrated in FIG. 4 has a bump or projection 57 along its aft face which lies in contact with the flange 48 at locations between the pins 60 and the outer edges of the spring clips 56. The projection 57 serves as a pivot to ensure that the seal lies perpendicular to the centerline of the rotor during operation which, in turn, creates the smallest leakage past the seal. Also as illustrated in FIG. 1, one end of the seal plate 50 includes an overlap 66 for sealing between adjacent shroud segments. These overlaps 66 also include "suck down" holes to assure the overlap creates an effective seal.

To install the leaf seal assembly, the outer and inner shrouds are coupled to one another, with the impingement plate therebetween, using the respective complementary hooks 16, 18 and grooves 20, 22. The leaf seal spring clips 56 are then installed in groove 46, followed by the leaf seal plate 50. The seal plate is disposed between the flange 48 and the trailing leg of the U-shaped clips 56. Pins 60 are then inserted through the aligned openings 54 and 58 and into the outer shroud 12 and tack-welded in place. The shroud segment is then circumferentially received on the turbine shell hook 32 and pinned in place.

Figure 2:
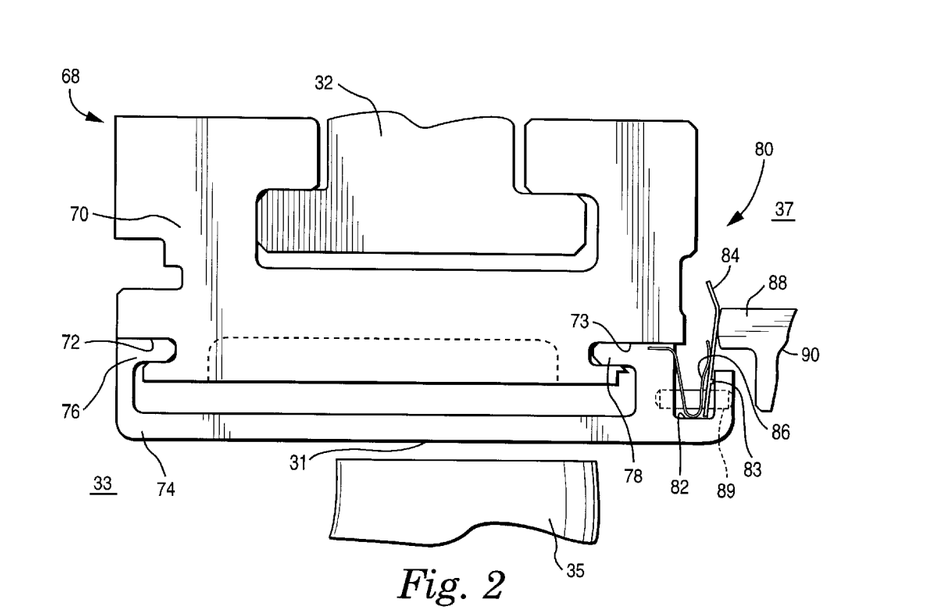
FIG. 2 is a fragmentary side elevational view of a leaf seal assembly for use with an inner shroud of the shroud segment.

In FIG. 2, a similar leaf seal assembly is mounted on an inner shroud. In this form, the stator shroud segment 68 includes an outer shroud 70 having a pair of grooves 72 and 73 along respective leading and trailing edges thereof. The inner shroud 74 has a pair of flanges 76 and 78 for engaging in the respective grooves 72 and 73 of the outer shroud 70. The leaf seal assembly, generally designated 80, is secured in a seat 82, e.g., a groove, formed along the trailing edge of the inner shrouds 74. As in the prior embodiment, the seal assembly 80 includes a seal plate 84 and a pair of spring clips 86, the spring clips and seal plate 84 having aligned openings 89 adjacent opposite ends of the groove for securing the seal assembly in the groove 82 of the inner shroud 74. Also as in the previous embodiment, a bump 83 is formed along the aft face of the plate 84 and serves as a pivot point such that the plate is perpendicular to the turbine rotor axis for effective sealing engagement against the flange of the leading edge side wall 88 of the nozzle band 90.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A seal for sealing between a stator shroud and a nozzle of a multi-stage gas turbine to substantially preclude leakage between a pressurized cavity on one side of the seal and hot gases in a hot gas path of the gas turbine on the other side of the seal, comprising:

a shroud segment having a surface for, in part, defining the hot gas path through one stage and overlying tips of buckets of said one stage forming part of a turbine rotor;

said shroud segment having a leading edge and a trailing edge;

an outer band for, in part, defining the hot gas path through an adjacent stage following said one stage and forming part of the nozzle of said adjacent stage;

a leaf seal between the trailing edge of said shroud segment and a leading edge side wall of said nozzle outer band;

said shroud segment having a seat for receiving said leaf seal; and a spring carried by said shroud segment and engaging said shroud segment and said leaf seal for biasing a portion of said leaf seal into sealing engagement with said leading edge side wall of said nozzle outer band.

2. A seal according to claim 1 wherein said leaf seal and said seat form a pivotal axis for said leaf seal at a location spaced from the engagement between said leaf seal and said leading edge side wall of said nozzle outer band wall.

3. A seal according to claim 2 wherein said leaf seal extends in a generally radial direction for sealing engagement with the leading edge side wall of the nozzle outer band.

4. A seal according to claim 1 including an extension on an end of said leaf seal for overlapping a leaf seal of an adjacent shroud segment.

5. A seal according to claim 1 wherein said shroud segment includes an outer shroud and an inner shroud connected to one another with said surface forming part of said inner shroud, said seat, spring and leaf seal being carried by said inner shroud.

6. A seal according to claim 1 wherein said shroud segment includes a radially outwardly opening groove along said trailing edge thereof, said leaf seal and said spring seating in said groove with a face portion of said leaf spring projecting from said groove for engaging the leaf seal to bias the leaf seal into sealing engagement with the leading edge side wall of the nozzle outer band.

7. A seal according to claim 6 wherein said spring includes a generally U-shaped clip having a base and a pair of legs, said leaf seal being engaged by said spring clip between a leg thereof and a flange forming part of said groove.

8. A seal according to claim 7 including a pin extending through said leaf seal and said spring clip and into said shroud segment to retain the spring and leaf seal in said groove.

9. A seal according to claim 6 wherein said shroud segment includes an outer shroud and an inner shroud connected to one another with said surface forming part of said inner shroud, said seat, spring and leaf seal being carried by said inner shroud.

10. A seal according to claim 1 wherein said shroud segment includes a radially outwardly opening groove along said trailing edge thereof, said leaf seal and said spring seating in said groove with a face portion of said leaf seal projecting from said groove for engagement with the nozzle outer band, said spring including a generally U-shaped clip having a base and a pair of legs, said leaf seal being engaged by said spring clip between a leg thereof and a flange forming part of said groove, a pin extending through said leaf seal and said spring clip and into said shroud segment to retain the spring and leaf seal in said groove, said shroud segment including an outer shroud and an inner shroud connected to one another with said surface forming part of said inner shroud, said seat, spring and leaf seal being carried by said inner shroud.

11. A seal for sealing between a stator shroud and a nozzle of a gas turbine to substantially preclude leakage between a pressurized cavity on one side of the seal and hot gases in a hot gas path of the gas turbine on the other side of the seal, comprising:

a shroud segment having a surface for, in part, defining the hot gas path and overlying tips of buckets forming part of a turbine rotor;

said shroud segment having a leading edge and a trailing edge;

an outer band for, in part, defining the hot gas path and forming part of the nozzle of the turbine;

a leaf seal between the trailing edge of said shroud segment and a leading edge side wall of said nozzle outer band;

said shroud segment having a seat for receiving said leaf seal;

a spring engaging said shroud segment and said leaf seal for biasing a portion of said leaf seal into sealing engagement with said leading edge side wall of said nozzle outer band; and said shroud segment including an outer shroud and an inner shroud connected to one another with said surface forming part of said inner shroud, said seat, spring and said leaf seal being carried by said outer shroud.

12. A seal for sealing between a stator shroud and a nozzle of a gas turbine to substantially preclude leakage between a pressurized cavity on one side of the seal and hot gases in a hot gas path of the gas turbine on the other side of the seal, comprising:

a shroud segment having a surface for, in part, defining the hot gas path and overlying tips of buckets forming part of a turbine rotor;

said shroud segment having a leading edge and a trailing edge;

an outer band for, in part, defining the hot gas path and forming part of the nozzle of the turbine;

a leaf seal between the trailing edge of said shroud segment and a leading edge side wall of said nozzle outer band;

said shroud segment having a seat for receiving said leaf seal;

a spring engaging said shroud segment and said leaf seal for biasing a portion of said leaf seal into sealing engagement with said leading edge side wall of said nozzle outer band;

said shroud segment including a radially outwardly opening groove along a trailing edge thereof, said leaf seal and said spring seating in said groove with a face portion of said leaf spring projecting from said groove for engagement with the leading edge side wall of the nozzle outer band; and said shroud segment including an outer shroud and an inner shroud connected to one another with said surface forming part of said inner shroud, said seat, spring and said leaf seal being carried by said outer shroud.

13. A seal for sealing between a stator shroud and a nozzle of a gas turbine to substantially preclude leakage between a pressurized cavity on one side of the seal and hot gases in a hot gas path of the gas turbine on the other side of the seal, comprising:

a shroud segment having a surface for, in part, defining the hot gas path and overlying tips of buckets forming part of a turbine rotor;

said shroud segment having a leading edge and a trailing edge;

an outer band for, in part, defining the hot gas path and forming part of the nozzle of the turbine;

a leaf seal between the trailing edge of said shroud segment and a leading edge side wall of said nozzle outer band;

said shroud segment having a seat for receiving said leaf seal;

a spring engaging said shroud segment and said leaf seal for biasing a portion of said leaf seal into sealing engagement with said leading edge side wall of said nozzle outer band; and said shroud segment including a radially outwardly opening groove along said trailing edge thereof, said leaf seal and said spring seating in said groove with a face portion of said leaf seal projecting from said groove for engagement with the nozzle outer band, said spring including a generally U-shaped clip having a base and a pair of legs, said leaf seal being engaged by said spring clip between a leg thereof and a flange forming part of said groove, a pin extending through said leaf seal and said spring clip and into said shroud segment to retain the spring and leaf seal in said groove, said shroud segment including an outer shroud and an inner shroud connected to one another with said surface forming part of said inner shroud, said seat, spring and said leaf seal being carried by said outer shroud.

* * * * *